(12) United States Patent
Terauchi et al.

(10) Patent No.: US 11,009,041 B2
(45) Date of Patent: May 18, 2021

(54) GAS TURBINE ENGINE WITH DIFFUSER HAVING AN ANNULAR DIVIDING GUIDE BODY

(71) Applicant: KAWASAKI JUKOGYO KABUSHIKI KAISHA, Kobe (JP)

(72) Inventors: Koji Terauchi, Kobe (JP); Daisuke Uemura, Kobe (JP); Hiroshi Kubo, Kobe (JP); Naoto Sakai, Osaka (JP); Toshimasa Miura, Kakogawa (JP); Yuki Ishitobi, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 106 days.

(21) Appl. No.: 16/013,322

(22) Filed: Jun. 20, 2018

(65) Prior Publication Data

US 2019/0003487 A1    Jan. 3, 2019

Related U.S. Application Data

(63) Continuation of application No. PCT/JP2016/088289, filed on Dec. 22, 2016.

(30) Foreign Application Priority Data

Dec. 25, 2015  (JP) .............................. JP2015-254073

(51) Int. Cl.
  *F04D 29/54*   (2006.01)
  *F23R 3/60*    (2006.01)
  (Continued)

(52) U.S. Cl.
  CPC ............. *F04D 29/547* (2013.01); *F01D 9/04* (2013.01); *F02C 3/06* (2013.01); *F02C 7/04* (2013.01);
  (Continued)

(58) Field of Classification Search
  CPC ... F01D 9/04; F02C 3/06; F04D 29/54; F04D 29/544; F04D 29/545; F04D 29/547; F23R 3/04; F23R 3/46; F23R 3/10; F23R 3/60
  See application file for complete search history.

(56) References Cited

U.S. PATENT DOCUMENTS 7,874,158 B2   1/2011   O'Neill et al.
8,133,017 B2   3/2012   Schott et al.
(Continued)

FOREIGN PATENT DOCUMENTS

DE   102011052241 A1   5/2012
JP   2000-314397 A     11/2000
(Continued)

OTHER PUBLICATIONS

International Search Report for PCT/JP2016/088289 dated Mar. 7, 2017 [PCT/ISA/210].

*Primary Examiner* — Scott J Walthour
(74) *Attorney, Agent, or Firm* — Sughrue Mion, PLLC

(57) ABSTRACT

A gas turbine engine, in which a compressed gas from a compressor is burned in a combustor and obtained combustion gas drives a turbine, includes: a compressed gas supply portion configured to supply the compressed gas obtained from the compressor to the combustor; an annular dividing guide body disposed in a diffuser that forms an upstream-side portion of the compressed gas supply portion, the dividing guide body being configured to divide the compressed gas in a radial direction; and a guide support body that supports the dividing guide body on an inner diameter side wall of the compressed gas supply portion.

12 Claims, 3 Drawing Sheets

(51) Int. Cl.
*F23R 3/46* (2006.01)
*F02C 7/04* (2006.01)
*F23R 3/04* (2006.01)
*F02C 3/06* (2006.01)
*F01D 9/04* (2006.01)
*F23R 3/10* (2006.01)

(52) U.S. Cl.
CPC .................. *F23R 3/04* (2013.01); *F23R 3/10* (2013.01); *F23R 3/46* (2013.01); *F23R 3/60* (2013.01); *F05D 2240/12* (2013.01); *F05D 2260/60* (2013.01)

(56) References Cited

U.S. PATENT DOCUMENTS

| | | | |
|---|---|---|---|
| 2007/0119145 | A1 | 5/2007 | O'Neill et al. |
| 2007/0271923 | A1* | 11/2007 | Dawson .................. F01D 9/023 60/751 |
| 2010/0239418 | A1 | 9/2010 | Schott et al. |
| 2012/0027578 | A1 | 2/2012 | Nanda |
| 2016/0003149 | A1* | 1/2016 | Suciu ........................ F02C 7/06 60/772 |

FOREIGN PATENT DOCUMENTS

| | | |
|---|---|---|
| JP | 2007-146838 A | 6/2007 |
| JP | 2010-223223 A | 10/2010 |
| WO | 2014134513 A1 | 9/2014 |

* cited by examiner

GAS TURBINE ENGINE WITH DIFFUSER HAVING AN ANNULAR DIVIDING GUIDE BODY

CROSS REFERENCE TO THE RELATED APPLICATION

This application is a continuation application, under 35 U.S.C. § 111(a), of international application No. PCT/JP2016/088289, filed Dec. 22, 2016, which claims priority to Japanese patent application No. 2015-254073, filed Dec. 25, 2015, the disclosure of which are incorporated by reference in their entirety into this application.

BACKGROUND OF THE INVENTION

Field of the Invention

The present invention relates to a gas turbine engine, and particularly to the structure of a passage through which compressed air is supplied from a compressor to a combustor.

Description of Related Art

Generally, in a gas turbine engine, a diffuser is provided at an outlet of a compressor, whereby static pressure of compressed air is recovered, and pressure loss (mainly, dynamic pressure loss) until the compressed air flows into a combustor is reduced. In order to recover the static pressure of the compressed air, it is effective to make the axial distance of an air flow path of the diffuser longer. In this case, however, the axial size of the entire gas turbine engine increases. Therefore, it is known that the air flow path of the diffuser is divided in the radial direction, thereby effectively reducing the pressure loss while suppressing an increase in the size of the gas turbine engine (refer to Patent Document 1, for example).

That is, the static pressure recovery ratio (rate of increase in static pressure at a diffuser outlet to a diffuser inlet) increases according to the area ratio of the outlet to the inlet, within a range causing no separation of air flow. The smaller the degree of enlargement of the flow-path area per unit length (flow-path enlargement rate) is, the less the separation of air flow occurs. In the case where the air flow path of the diffuser is divided in the radial direction, since the radial dimension of each of the divided flow paths is smaller than that of the single flow path, i.e., the same air flow path but not divided, the flow-path enlargement rate is reduced if the flow-path length is the same. Consequently, separation of air flow is not likely to occur, and therefore, the static pressure recovery ratio can be increased by increasing the area ratio of the outlet to the inlet of the air flow path of the diffuser.

RELATED DOCUMENT

Patent Document

[Patent Document 1] JP Laid-open Patent Publication No. 2010-223223

SUMMARY OF THE INVENTION

However, as disclosed in Patent Document 1, in the case where a division body for dividing the air flow path of the diffuser is supported axially rearward via struts, which are supports for supporting other structures in the gas turbine engine, arrangement of the division body and its support body is limited by the positions of the struts. In the gas turbine engine in which multiple components need to be disposed within a limited space, the above configuration makes it difficult to sufficiently reduce the pressure loss by adjusting the position of the division body, taking into account the positional relationship with other components forming the gas turbine engine.

In order to solve the above-described problem, an object of the present invention is to provide a gas turbine engine having a diffuser divided in the radial direction, in which the degree of freedom in arranging a division body and its support body is ensured, thereby sufficiently reducing the pressure loss of the compressed gas while suppressing an increase in the size of the gas turbine engine.

In order to attain the above-described object, a gas turbine engine according to the present invention is a gas turbine engine in which a compressed gas from a compressor is burned in a combustor and obtained combustion gas drives a turbine. The gas turbine engine includes: a compressed gas supply portion configured to supply the compressed gas obtained from the compressor to the combustor; a dividing guide body of an annular shape disposed in a diffuser that forms an upstream-side portion of the compressed gas supply portion, the dividing guide body being configured to divide the compressed gas in a radial direction; and a guide support body that supports the dividing guide body on an inner diameter side wall of the compressed gas supply portion.

In other words, the guide support body is supported only by the inner diameter side wall, and is provided spaced apart from other neighboring members, for example, a diffuser outer diameter side wall that forms the diffuser.

According to this configuration, since the dividing guide body for dividing the compressed gas in the radial direction is supported from the inner diameter side wall forming the compressed gas supply portion, the degree of freedom in arranging the dividing guide body and the support body thereof is ensured. Therefore, in order to effectively reduce the pressure loss of the compressed gas, the dividing guide body and the guide support body can be disposed while also taking into account the positional relationship with other components of the gas turbine engine. Thus, the pressure loss of the compressed gas can be sufficiently reduced while suppressing an increase in the size of the gas turbine engine.

In one embodiment of the present invention, the guide support body may be disposed radially inward of a transition duct configured to lead the combustion gas from the combustor to the turbine located axially rearward of the combustor. According to this configuration, the compressed gas is divided in the circumferential direction by the radially extending guide support body, at a position radially inward of the transition duct. Therefore, the compressed gas can be uniformly supplied to the spaces between a plurality of transition ducts from the narrow space between the transition ducts and the inner diameter side wall.

In one embodiment of the present invention, the guide support body may have: a leg portion projecting radially outward from the inner diameter side wall of the compressed gas supply portion; and a mounting portion to which the dividing guide body is mounted. The leg portion may have such a shape that a width thereof in a tangential direction increases from a front end thereof toward the rear side, for example, a substantially triangular pole shape that is tapered toward a front side. According to this configuration, the compressed gas can be divided in the circumferential direction while reducing the pressure loss due to the guide support body.

In one embodiment of the present invention, the dividing guide body may be mounted to the guide support body by means of a screw element that penetrates through the guide support body from the rear side and is screwed into the dividing guide body. According to this configuration, since the compressed gas does not directly collide against the screw element, assembling of the dividing guide body and the guide support body is simplified while suppressing occurrence of a pressure loss due to the screw element.

In one embodiment of the present invention, the guide support body may be formed integrally with the inner diameter side wall. According to this configuration, the number of components of the diffuser for the compressor having the aforementioned advantages is reduced, and assembling is simplified accordingly.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Hereinafter, an embodiment according to the present invention will be described with reference to the drawings. However, the present invention is not limited to the embodiment.

Figure 1:
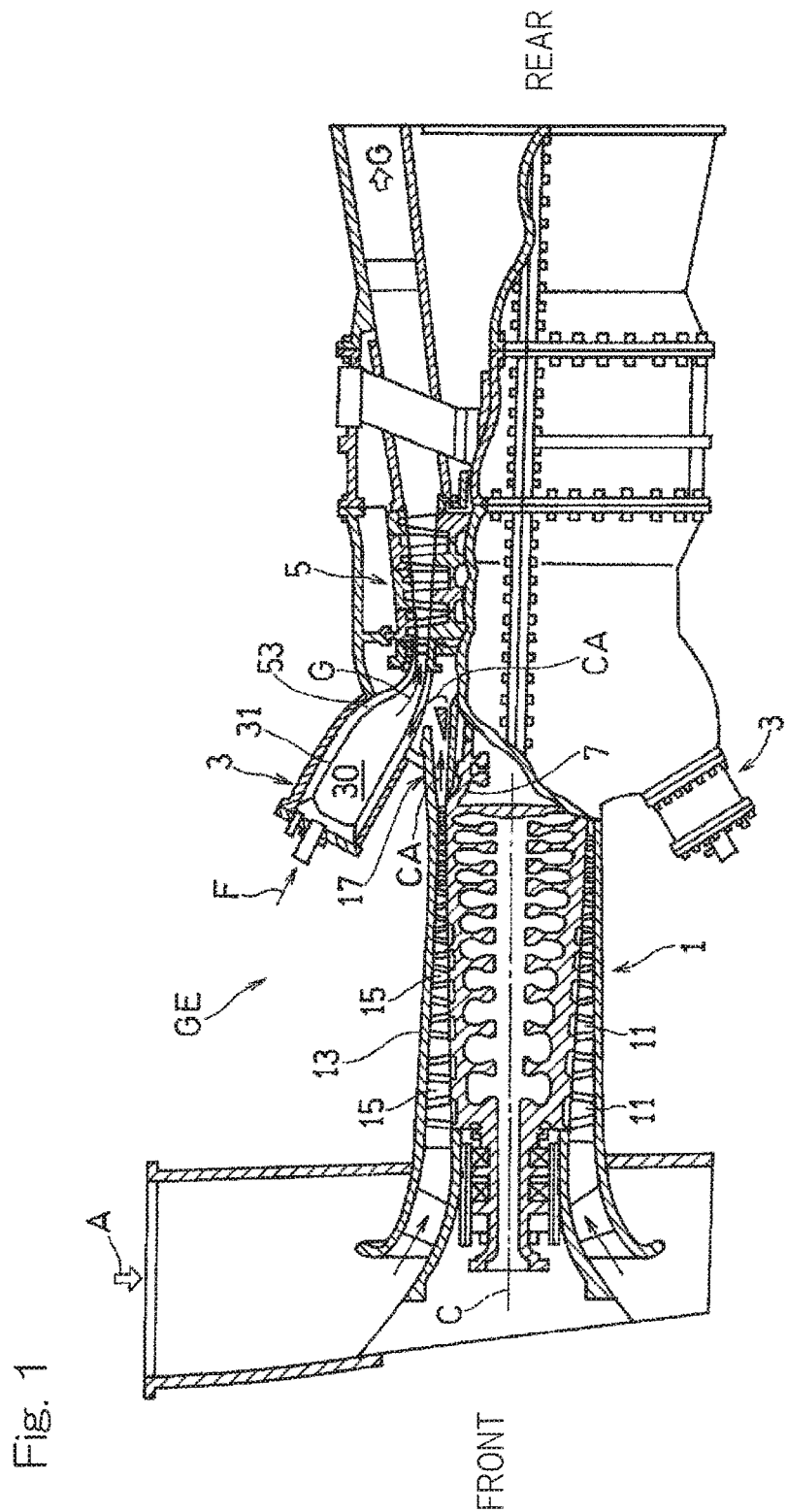
FIG. 1 is a partially cut-away side view showing a schematic structure of a gas turbine engine including a diffuser for a compressor, according to an embodiment of the present invention.

FIG. 1 is a partially cut-away side view of a gas turbine engine (hereinafter simply referred to as "gas turbine") GE according to one embodiment of the present invention. In the gas turbine GE, an air A introduced from the outside is compressed by a compressor 1 and guided to a combustor 3, a fuel F is burned together with the compressed air CA in the combustor 3, and a turbine 5 is driven by using the obtained high temperature and high pressure combustion gas G. In the present embodiment, a plurality of can-type combustors 3 are arranged at equal intervals along the circumferential direction of the gas turbine GE. In the description below, the compressor 1 side in the axis C direction of the gas turbine GE may be referred to as "front side", and the turbine 5 side in the axis C direction of the gas turbine GE may be referred to as "rear side". The terms "front" and "rear" included in the names of elements constituting the embodiment have the same meanings. In addition, in the description below, the terms "axial direction", "circumferential direction", and "radial direction" respectively mean the axis C direction, the circumferential direction, and the radial direction of the gas turbine GE, unless otherwise specified.

In the present embodiment, a compressor of an axial flow type is used as the compressor 1. The axial-flow compressor 1 compresses the air A taken from the outside, by using a combination of: multiple rotor blades 11 disposed on an outer peripheral surface of a rotor 7 forming a rotary part of the gas turbine GE; and multiple stator blades 15 disposed on an inner peripheral surface of a housing 13. The compressed air CA obtained from the compressor 1 is supplied to the combustor 3 through a compressed gas supply portion 17 connected to a downstream end portion of the compressor 1. The high temperature and high pressure combustion gas G generated in the combustor 3 is sent to the turbine 5.

Figure 2:
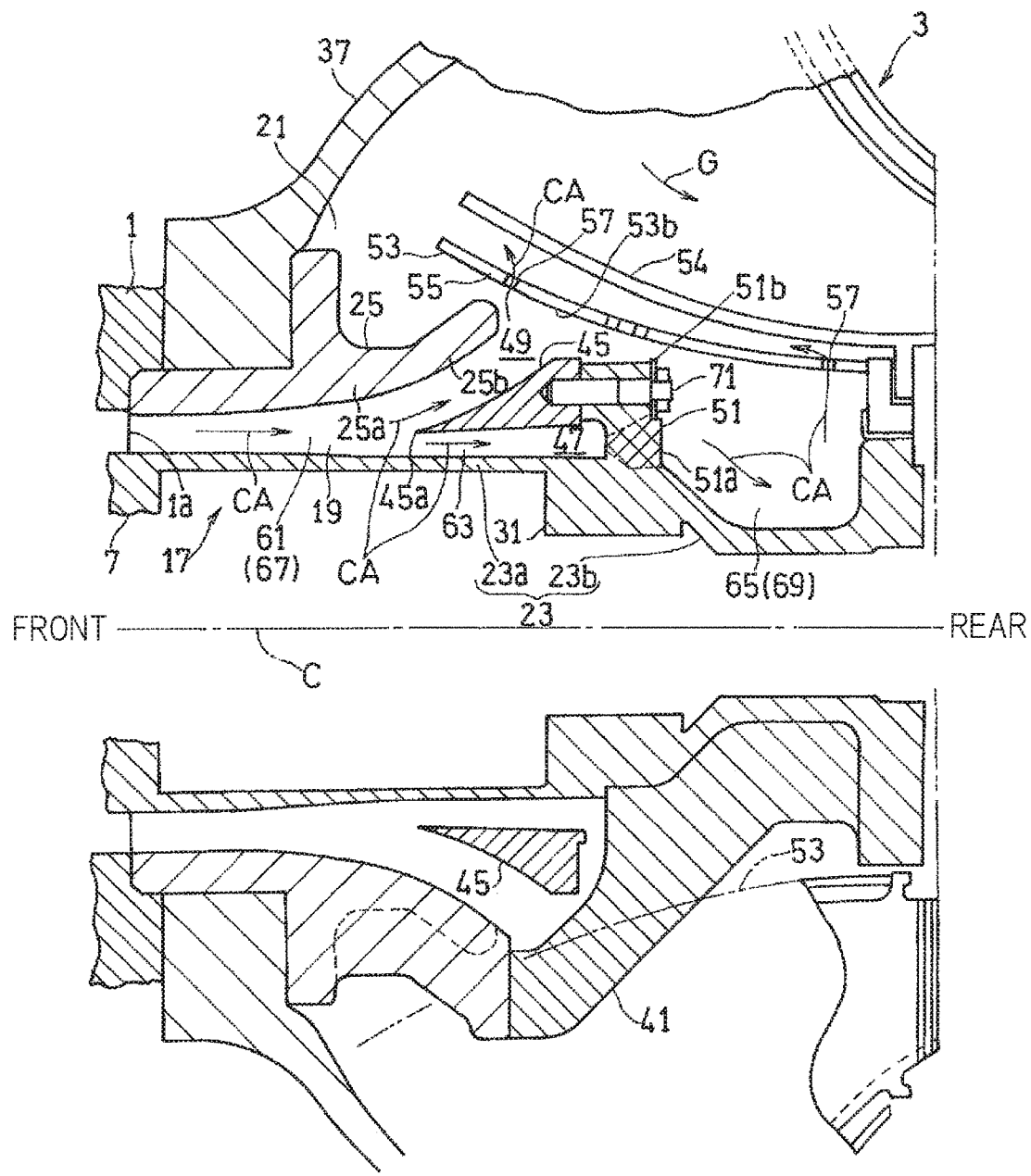
FIG. 2 is a longitudinal cross-sectional view showing, in an enlarged manner, a peripheral portion of the diffuser for the compressor of the gas turbine engine shown in FIG. 1.

As shown in FIG. 2, the compressed gas supply portion 17 includes: a diffuser 19 forming an upstream portion thereof; and a chamber 21 which is located downstream of the diffuser 19 and guides the compressed air CA having passed through the diffuser 19 into the combustor 3. The diffuser 19 guides the compressed air CA discharged from an outlet 1a of the compressor 1 toward the rear side in the axial direction. The diffuser 19 includes a flow path, the area of which gradually increases from an inlet of the diffuser 19 connected to the compressor outlet 1a, toward the rear side. The compressed air CA discharged from the compressor outlet 1a passes through the diffuser 19, whereby the static pressure is recovered.

In the present embodiment, the diffuser 19 is formed between a front (upstream-side) portion, connected to the compressor 1, of an inner diameter side wall 23 of the compressed gas supply portion 17, and a diffuser outer diameter side wall 25 of a tubular shape provided radially outward of a front portion of the inner diameter side wall 23. The inner diameter side wall 23 is a cylindrical wall which separates a supply path of the compressed gas supply portion 17 from an accommodation space for components (e.g., the rotor 7) of the gas turbine GE disposed radially inward of the supply path. In the present embodiment, the inner diameter side wall 23 includes: a front inner-diameter wall portion 23a, which is the aforementioned front portion connected to the compressor outlet 1a; and a rear inner-diameter wall portion 23b connected to a rear end of the front inner-diameter wall portion 23a.

The diffuser outer diameter side wall 25 is formed in a tubular shape having a diameter gradually increasing from the front side toward the rear side. More specifically, in the illustrated example, the diffuser outer diameter side wall 25 includes a front portion 25a and a rear portion 25b having different inclination angles of peripheral walls with respect to the axial direction. Specifically, the diffuser outer diameter side wall 25 is formed such that the front portion 25a thereof has a smaller inclination angle with respect to the axis C while the rear portion 25b thereof has a greater inclination angle with respect to the axis C. The diffuser outer diameter side wall 25 is disposed such that a rear end thereof is located frontward of a rear end of the front inner-diameter wall portion 23a of the inner diameter side wall 23.

The chamber 21 is formed by a chamber casing 37 provided radially outward of the diffuser 19 of the compressed gas supply portion 17, and the diffuser outer diameter side wall 25. The chamber casing 37 forms a portion of a casing for the entire gas turbine GE.

The compressed gas supply portion 17 is provided with a plurality of struts 41 for reinforcement which are radially projected from the inner diameter side wall 23. The plurality of struts 41 are disposed spaced apart from each other in the circumferential direction. The struts 41 are used for supporting, for example, the components of the gas turbine GE which are disposed around the compressed gas supply portion 17. In the present embodiment, the struts 41 support the diffuser outer diameter side wall 25 of the compressed gas supply portion 17. In the illustrated example, more specifically, each strut 41 is projected so as to incline radially outward and frontward from the rear inner-diameter wall portion 23b of the inner diameter side wall 23.

The specific structures of the members forming the diffuser 19 and the chamber 21, e.g., manners of connecting the members, are not limited to the illustrated example.

In the diffuser 19 of the compressed gas supply portion 17, a dividing guide body 45 having an annular shape is provided. The dividing guide body 45 divides the flow of the compressed air CA, discharged from the compressor 1, in the radial direction. In the illustrated example, the dividing guide body 45 divides the flow of the compressed air CA into an inner division path 47 and an outer division path 49 which are divided in the radial direction. Specifically, the dividing guide body 45 has such a shape that the radial width of a cross section of a front portion thereof increases from the front end toward the rear side. Therefore, the air flow that has collided against a front end 45a of the dividing guide body 45 is divided into outward and inward in the radial direction. In the illustrated example, the cross section of the front portion of the dividing guide body 45 has a triangular shape with the front end 45a being one vertex.

The dividing guide body 45 is supported through a guide support body 51 on the inner diameter side wall 23 of the compressed gas supply portion 17, i.e., the inner diameter side wall 23 of the inner division path 47. In the illustrated example, a plurality of (in this example, six) guide support bodies 51 are projected radially outward from the inner diameter side wall 23. In the illustrated example, the guide support bodies 51 are projected radially outward from a front end portion of the rear inner-diameter wall portion 23b of the inner diameter side wall 23. In other words, the guide support bodies 51 are provided downstream (rearward) of the diffuser 19. In the present embodiment, each guide support body 51 is formed integrally with the inner diameter side wall 23. The guide support body 51 may be formed separately from the inner diameter side wall 23. However, the guide support bodies 51 being formed integrally with the inner diameter side wall 23 allows the number of components of the compressed gas supply portion 17 for the compressor to be reduced, and allows assembling to be simplified. In FIG. 2, for the sake of convenience of description, a cross section including the guide support body 51 is shown on the upper side of the axial line C of the gas turbine GE, while a cross section including the strut 41 is shown on the lower side of the axial line C.

The plurality of guide support bodies 51 are disposed spaced apart from each other at equal intervals in the circumferential direction. Arrangement of the guide support bodies 51 in the axial direction and the circumferential direction will be described below in detail.

Figure 3:
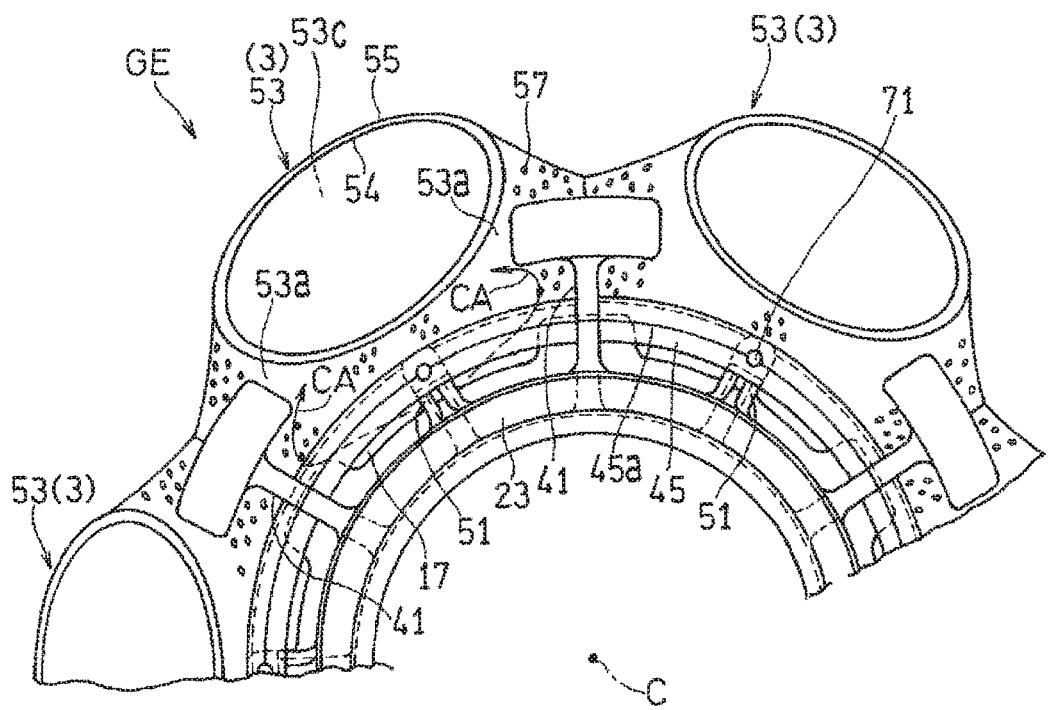
FIG. 3 is a front view showing the peripheral portion of the diffuser for the compressor of the gas turbine engine shown in FIG. 1.

As shown in FIG. 3, each guide support body 51 is disposed radially inward of a transition duct 53 at the same circumferential position as the transition duct 53. The transition duct 53 leads the high temperature combustion gas G generated in the combustor 3 toward the turbine 5 located axially rearward. Specifically, the transition duct 53 of the combustor 3 is connected downstream of a combustion tube 31 forming a combustion chamber 30 shown in FIG. 1, and supplies the combustion gas G from the combustion chamber 30 to the turbine 5. The transition duct 53 includes: a transition duct body 54 having a flow path for the combustion gas G formed inside thereof; and a duct cover 55 covering the outer periphery of the transition duct body 54 with a gap intervening therebetween.

As shown in FIG. 3, the duct cover 55 is formed with, over substantially the entire surface of thereof, multiple air introduction holes 57 for introducing the compressed air CA into the combustor 3. Accordingly, the duct cover 55 functions as an air introduction member for introducing the compressed air CA into the combustor 3. The air introduced through the air introduction holes 57 of the duct cover 55 is also used as a cooling medium for cooling the surface of the transition duct body 54. Each guide support body 51 is disposed at a location inward of the transition duct 53 having the above structure in the radial direction of the gas turbine engine, that is, at a location where the transition duct 53 and the guide support body 51 circumferentially and axially overlap each other.

In the present embodiment, each strut 41 is disposed at a circumferential position that is a middle position between two adjacent combustors 3. Therefore, each guide support body 51 is disposed at a circumferential position between two struts 41 adjacent to each other in the circumferential direction. Further, as shown in FIG. 2, each strut 41 is disposed such that at least a portion thereof overlaps the transition duct 53 of the combustor 3 as viewed in the circumferential direction. In other words, the strut 41 is located near a circumferential side surface (surface facing in the circumferential direction) 53a of the transition duct 53.

The diffuser 19 of the compressed gas supply portion 17 having the above structure includes a front diffuser portion 61 and a rear diffuser portion 63. Further, a diffuser rearward portion 65 is provided rearward of the rear diffuser portion 63. The front diffuser portion 61 is a portion formed between the front inner-diameter wall portion 23a of the inner diameter side wall 23 and the front portion of the diffuser outer diameter side wall 25, and includes a main path 67 corresponding to an axial range from the diffuser inlet to the front end of the dividing guide body 45. The rear diffuser portion 63 is a portion including the inner division path 47 and the outer division path 49 which are formed by the front inner-diameter wall portion 23a of the inner diameter side wall 23, the rear portion of the diffuser outer diameter side wall 25, and the dividing guide body 45 located therebetween. That is, the axial range of the rear diffuser portion 63 corresponds to the axial range of the dividing guide body 45. The diffuser rearward portion 65 is a portion formed radially outward of the rear inner-diameter wall portion 23b of the inner diameter side wall 23, and has a rear path 69 connected downstream of the inner division path 47.

Figure 4:
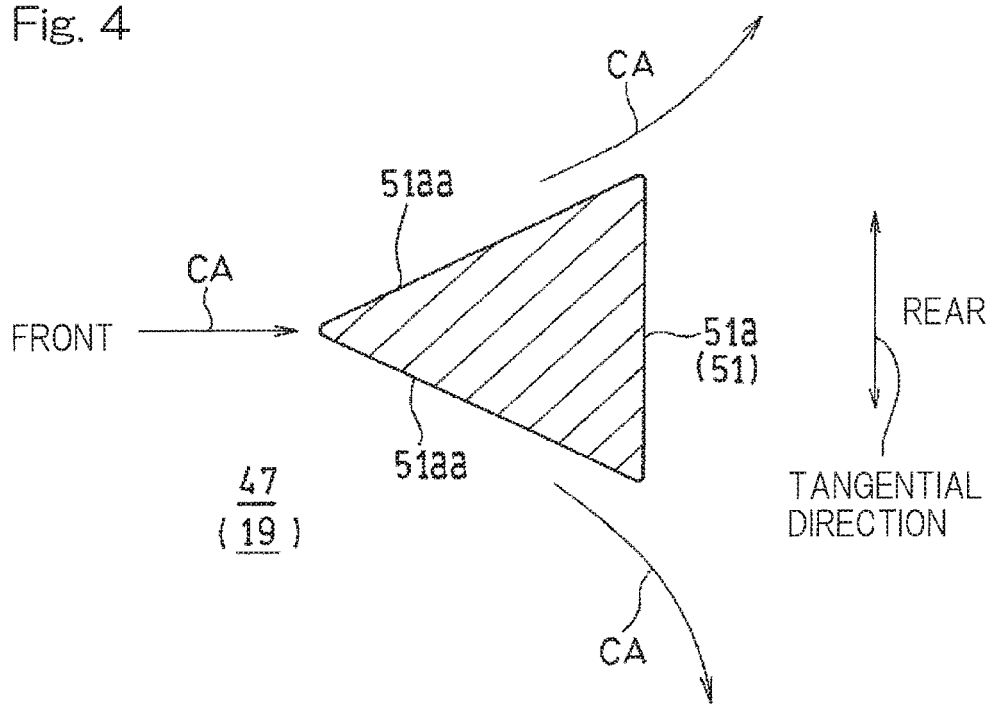
FIG. 4 is a cross-sectional view showing a leg portion of a guide support body used for the diffuser for the compressor shown in FIG. 2.

The guide support body 51 includes: a leg portion 51a projecting radially outward from the inner diameter side wall 23 of the compressed gas supply portion 17; and a mounting portion 51b to which the dividing guide body 45 is mounted. As shown in FIG. 4, the leg portion 51a has such a shape that the width in a tangential direction increases from the front end thereof toward the rear side. The "tangential direction" means a tangential direction with respect to the circumferential direction of the gas turbine GE. In the illustrated example, the leg portion 51a has two side surfaces 51aa facing in the tangential direction, and the two side surfaces 51aa are gradually separated from each other toward the rear side. More specifically, in the illustrated example, the leg portion 51a has a substantially triangular pole shape that is tapered toward the front side.

As shown in FIG. 2, in the present embodiment, the dividing guide body 45 is mounted to the mounting portion 51b of the guide support body 51 by means of a screw element 71 which penetrates through the mounting portion 51b of the guide support body 51 from the rear side and is screwed into the dividing guide body 45. The manner of mounting the dividing guide body 45 to the guide support body 51 is not limited to the above example. For example, with the dividing guide body 45 being superposed on a top portion (portion facing radially outward) of the guide support body 51, the dividing guide body 45 may be mounted to the guide support body 51 by means of a screw element which penetrates through the dividing guide body 45 from radially outside and is screwed into the guide support body 51. However, when the mounting structure in which the screw element 71 is screwed from the rear side as described above is adopted, the compressed air CA is prevented from directly colliding against the screw element 71, whereby occurrence of a pressure loss due to the screw element 71 can be suppressed, and assembling of the dividing guide body 45 and the guide support body 51 can be simplified.

Next, the function of the compressed gas supply portion 17 of the gas turbine GE configured as described above will be described.

The compressed air CA discharged from the compressor outlet 1a flows into the diffuser 19 of the compressed gas supply portion 17, passes through the diffuser 19 and the chamber 21, and is introduced to the air introduction holes 57 of the combustor 3. A portion of the diffuser 19 from the main path 67 to the inner division path 47 and the outer division path 49 is formed such that the flow-path area thereof gradually increases radially rearward which is the advancing direction of the compressed air flow, whereby the static pressure of the compressed air CA is recovered. In particular, in the rear diffuser portion 63 of the diffuser 19, since the flow path for the compressed air CA is radially divided by the dividing guide body 45, a greater static pressure recovery ratio can be obtained as compared with a single flow path having the same flow-path length. Further, since the compressed gas supply portion 17 is provided with the diffuser rearward portion 65 which is formed in the rear inner-diameter wall portion 23b and has a recess portion recessed radially inward, the compressed air CA passing through the inner division path 47 flows into the relatively wide space of the recess portion, whereby the static pressure is further recovered. Thus, the guide support bodies 51 supporting the dividing guide body 45 are provided at the inner diameter side wall 23 of the compressed gas supply portion 17, and the space rearward of the dividing guide body 45 can be effectively used to obtain a greater static pressure recovery ratio.

Since each guide support body 51 is projected from the inner diameter side wall 23 of the compressed gas supply portion 17, the guide support body 51 also functions as a circumferentially dividing body which circumferentially divides the flow of the compressed air CA passing through the inner division path 47, as shown in FIG. 4. Therefore, one portion of the compressed air CA from the compressor 1 reaches an inner diameter side surface 53b of the transition duct 53 through the outer division path 49 shown in FIG. 2, while the other portion of the compressed air CA circumferentially divides from the inner division path 47 and uniformly reaches an outer diameter side surface 53c of the transition duct 53 from the opposite circumferential side surfaces 53a. Thus, the compressed air CA can be uniformly supplied to the spaces between the plurality of transition ducts 53 through the narrow space between the transition ducts 53 and the inner diameter side wall 23. Since the compressed air CA flows into each combustor 3 through the multiple air introduction holes 57 provided at the surface of the transition duct 53, the flow of the compressed air CA is uniformly supplied to the entire surface of the transition duct 53 and introduced into the combustor 3, thereby reducing the pressure loss extremely effectively. In particular, in the present embodiment, as shown in FIG. 4, since the leg portion 51a of the guide support body 51 has such a shape that the width in the tangential direction increases from the front end toward the rear side, that is, a substantially triangular pole shape that is tapered toward the front side, the flow of the compressed air CA can be divided in the circumferential direction while the pressure loss due to the guide support bodies 51 is reduced.

Moreover, as is apparent from FIG. 2, the guide support bodies 51 are supported only by the inner diameter side wall 23, are formed separately from the neighboring members such as the diffuser outer diameter side wall 25 and the struts 41, and are disposed spaced apart from these members. Thus, the degree of freedom in arranging the guide support bodies 51 as circumferential flow dividing bodies is ensured. Although the guide support bodies 51 are disposed rearward of the diffuser 19 in the illustrated example, the guide support bodies 51 may be disposed in the diffuser 19.

Further, as shown in FIG. 3, in the present embodiment, the transition duct 53 of each combustor 3 is disposed at a circumferential position between two struts 41 adjacent to each other in the circumferential direction, and the guide support body 51 is disposed radially inward of the transition duct 53. Therefore, the compressed air CA divided in the circumferential direction by the guide support body 51 is guided in the direction toward the transition duct 53 by the strut 41 located near the circumferential both side surface 53a of the transition duct 53. Thus, the pressure loss can be reduced more effectively.

As described above, in the gas turbine GE according to the present embodiment, the dividing guide body 45 for dividing the compressed gas in the radial direction is supported from the inner diameter side wall 23 forming the compressed gas supply portion 17. Therefore, limitation in arranging the dividing guide body 45 in the circumferential direction and the axial direction is reduced, and the degree of freedom in arranging the dividing guide body 45 and the guide support bodies 51 is ensured. Therefore, in order to effectively reduce the pressure loss of the compressed air CA, the dividing guide body 45 and the guide support bodies 51 can be disposed while also taking into account the positional relationship with other components (in the above example, the transition ducts 53 of the combustors 3, the struts 41, and the like) of the gas turbine engine. Thus, the pressure loss of the compressed air can be sufficiently reduced while suppressing an increase in the size of the gas turbine engine.

In the present embodiment, the compressed air CA is divided into two division paths provided radially inward and outward (i.e., one inner division path 47 and one outer division path 49) by using the single dividing guide body 45. However, by using a plurality of division guide bodies 45 disposed in the radial direction, the compressed air CA may be divided into three or more division paths (one inner division path 47 and a plurality of outer division paths 49). In the present embodiment, a gas turbine engine using air as a working gas is described as an example of the gas turbine GE. However, a gas turbine engine using a working gas other than air, such as methane gas, is also within the scope of the present invention.

Although the present invention has been described above in connection with the preferred embodiments thereof with reference to the accompanying drawings, numerous additions, changes, or deletions can be made without departing from the gist of the present invention. Accordingly, such additions, changes, or deletions are to be construed as included in the scope of the present invention.

REFERENCE NUMERALS

1 . . . Compressor
3 . . . Combustor
5 . . . Turbine
17 . . . Compressed gas supply portion
19 . . . Diffuser
23 . . . Inner diameter side wall of compressed gas supply portion
25 . . . Diffuser outer diameter side wall
41 . . . Strut
45 . . . Dividing guide body
47 . . . Inner division path
49 . . . Outer division path
51 . . . Guide support body
51a . . . Leg portion of guide support body
51b . . . Mounting portion of guide support body
53 . . . Transition duct
CA . . . Compressed air (compressed gas)
GE . . . Gas turbine engine

What is claimed is:

1. A gas turbine engine in which a compressed gas from a compressor is burned in a combustor and obtained combustion gas drives a turbine, the gas turbine engine comprising:
a compressed gas supply portion configured to supply the compressed gas obtained from the compressor to the combustor;
a dividing guide body of an annular shape disposed in a diffuser that forms an upstream-side portion of the compressed gas supply portion, the dividing guide body being configured to divide the compressed gas in a radial direction; and
a guide support body that supports the dividing guide body on an inner diameter side wall of the compressed gas supply portion, wherein
the guide support body is provided on a downstream side of the diffuser so as to protrude radially outward from the inner diameter side wall, and
the diffuser is formed between a front portion, of the inner diameter side wall, connected to the compressor, and a diffuser outer diameter side wall disposed radially outward of the front portion, and the guide support body is disposed such as to be supported only by the inner diameter side wall and spaced apart from the outer diameter side wall.

2. The gas turbine engine as claimed in claim 1, wherein the guide support body is disposed radially inward of a transition duct configured to lead the combustion gas from the combustor to the turbine located axially rearward of the combustor.

3. The gas turbine engine as claimed in claim 2, wherein the guide support body has: a leg portion projecting radially outward from the inner diameter side wall of the compressed gas supply portion; and a mounting portion to which the dividing guide body is mounted, and the leg portion has such a shape that a width thereof in a tangential direction increases from a front end of the leg portion toward a rear side of the leg portion.

4. The gas turbine engine as claimed in claim 3, wherein the leg portion has a substantially triangular pole shape that is tapered toward a front side of the leg portion.

5. The gas turbine engine as claimed in claim 1, wherein the dividing guide body is mounted to the guide support body by means of a screw element that penetrates through the guide support body from a rear side of the guide support body and is screwed into the dividing guide body.

6. The gas turbine engine as claimed in claim 1, wherein the guide support body is formed integrally with the inner diameter side wall.

7. A gas turbine engine in which a compressed gas from a compressor is burned in a combustor and obtained combustion gas drives a turbine, the gas turbine engine comprising:
a compressed gas supply portion configured to supply the compressed gas obtained from the compressor to the combustor;
a dividing guide body of an annular shape disposed in a diffuser that forms an upstream-side portion of the compressed gas supply portion, the dividing guide body being configured to divide the compressed gas in a radial direction; and
a guide support body that supports the dividing guide body on an inner diameter side wall of the compressed gas supply portion, wherein
the guide support body protrudes in the radial direction from an outer radial surface of the inner diameter side wall, and is formed separately from an outer diameter side wall of the diffuser, and
the diffuser is formed between a front portion, of the inner diameter side wall, connected to the compressor, and the outer diameter side wall disposed radially outward of the front portion, and the guide support body is disposed such as to be supported only by the inner diameter side wall and spaced apart from the outer diameter side wall.

8. The gas turbine engine as claimed in claim 7, wherein the guide support body is disposed radially inward of a transition duct configured to lead the combustion gas from the combustor to the turbine located axially rearward of the combustor.

9. The gas turbine engine as claimed in claim 8, wherein the guide support body has: a leg portion projecting radially outward from the inner diameter side wall of the compressed gas supply portion; and a mounting portion to which the dividing guide body is mounted, and the leg portion has such a shape that a width thereof in a tangential direction increases from a front end of the leg portion toward a rear side of the leg portion.

10. The gas turbine engine as claimed in claim 9, wherein the leg portion has a substantially triangular pole shape that is tapered toward a front side of the leg portion.

11. The gas turbine engine as claimed in claim 7, wherein the dividing guide body is mounted to the guide support body by means of a screw element that penetrates through the guide support body from a rear side of the guide support body and is screwed into the dividing guide body.

12. The gas turbine engine as claimed in claim 7, wherein the guide support body is formed integrally with the inner diameter side wall.

* * * * *